(12) United States Patent
Nagami

(10) Patent No.: US 8,497,971 B2
(45) Date of Patent: Jul. 30, 2013

(54) LIQUID CRYSTAL DISPLAY DEVICE

(75) Inventor: Takahiro Nagami, Mobara (JP)

(73) Assignees: Hitachi Displays, Ltd., Chiba (JP); Panasonic Liquid Crystal Display Co., Ltd., Hyogo-Ken (JP)

(*) Notice: Subject to any disclaimer, the term of this patent is extended or adjusted under 35 U.S.C. 154(b) by 170 days.

(21) Appl. No.: 13/041,701

(22) Filed: Mar. 7, 2011

(65) Prior Publication Data

US 2011/0216282 A1 Sep. 8, 2011

(30) Foreign Application Priority Data

Mar. 8, 2010 (JP) ................................ 2010-050475

(51) Int. Cl.
*G02F 1/1339* (2006.01)
(52) U.S. Cl.
USPC ......................................................... 349/153
(58) Field of Classification Search
USPC ......................................................... 349/153
See application file for complete search history.

(56) References Cited

U.S. PATENT DOCUMENTS 6,774,972 B2 * 8/2004 Park .............................. 349/153
2006/0028609 A1 * 2/2006 Nakayoshi et al. ........... 349/153

FOREIGN PATENT DOCUMENTS

JP 2001-66607 3/2001
JP 2008-046307 2/2008

* cited by examiner

*Primary Examiner* — James Dudek
(74) *Attorney, Agent, or Firm* — Antonelli, Terry, Stout & Kraus, LLP.

(57) ABSTRACT

A liquid crystal display device allows for improving the adhesion strength of a transparent substrate and reducing the size of the portion outside the display area not contributing to image display. The liquid crystal display device includes a first substrate and a second substrate opposed to the first substrate by way of liquid crystals, and a sealing material formed outside the display area where a plurality of pixels are formed. The first substrate and/or the second substrate having at least one sealing hole, the sealing hole passing through thin film layers formed over the surface of the first substrate and/or the second substrate at the side such that the base material of the substrate is exposed, the sealing holes are formed in a region on a side opposite to the side where a driving circuit is disposed, and the sealing material is formed in the region including the sealing holes.

8 Claims, 6 Drawing Sheets

LIQUID CRYSTAL DISPLAY DEVICE

CLAIM OF PRIORITY

The present application claims priority from Japanese Patent Application JP 2010-050475 filed on Mar. 8, 2010, the content of which is hereby incorporated by reference into this application.

BACKGROUND OF THE INVENTION

1. Field of the Invention

The present invention relates to a liquid crystal display device. The invention particularly relates to a technique of securing a TFT substrate to a color filter substrate in which the TFT substrate has thin film transistors for pixels formed thereon and the color filter substrate is opposed to a glass substrate by way of liquid crystals.

2. Description of the Related Art

The liquid crystal display device has a structure of sandwiching liquid crystals between a first substrate and a second substrate. The first substrate has a plurality of drain lines and gate lines intersecting the drain lines formed thereon. The first substrate has pixels formed in regions surrounded by the drain lines and the gate linens. The first substrate has thin film transistors formed on every pixel. The second substrate has color filters of R (red), G (green), and B (blue) formed thereon, with the color filters forming pixels for color display. To secure the first substrate to the second substrate and seal the liquid crystals, the substrates are secured to each other by a sealing material, which is coated in a circular shape at the periphery of the second substrate. The liquid crystals are also sealed therewith. In the liquid crystal display device described above, alignment films for controlling the initial alignment of liquid crystal molecules are formed within the surfaces of the first substrate and the second substrate on the side of the liquid crystals in a region, where the liquid crystals are sealed and pixels are formed, that is, a so-called display area. To stably control the positioning accuracy of a coating device for the alignment films and the initial alignment of the liquid crystal molecules in the display area, the alignment films are generally coated as far as the region slightly exceeding the display area when the alignment films are formed.

In a liquid crystal display device mounted to a personal digital assistant including a mobile phone, it is demanded to enlarge the display area and increase fineness and image quality in a casing having a restricted size. For this purpose, the display area is enlarged by decreasing the ratio in which a frame region that does not contribute to image display occupies a space in the first substrate and the second substrate forming a liquid crystal display panel, that is, by narrowing a frame region (so-called narrow frame). This allows for multilayering interconnections in the frame region and improvement in fineness and image quality has been progressed.

However, in recent years, the distance from the end of the display area to the side edge of the liquid crystal display panel is about 1 to 2 mm, and worryingly the alignment film may overlap the coating region of the sealing material as the frame is further narrowed. In particular, since a polyimide-based material for forming the alignment film has a low adhesion, if the alignment film overlaps the coating region of the sealing material, adhesion among the sealing material, the first substrate, and the second substrate may be lowered.

The technique of improving the adhesion between the sealing material and the first and the second substrate includes techniques as described in JP-A-2001-66607 and JP-A-2008-46307. In the technique described in JP-A-2001-66607, a sealing material is coated such that the outer periphery of the sealing material coated at the corner of a liquid crystal display panel is at the outer side of the substrate than the outer periphery of the sealing material coated to the side. Further, the technique described in JP-A-2008-46307 is configured as follows. Over a region where the sealing material is coated from the side edge of the liquid crystal panel, an areas defined by removing part of a first insulation film is provided at four corners of the liquid crystal display panel and the sealing material is coated also to part of such areas to secure a pair of substrates.

SUMMARY OF THE INVENTION

In the technique described in Japanese Patent Laid-Open No. 2008-46307, the removed area is a region formed by removing a first insulation film including an organic insulation film for planarizing the unevenness on the substrate caused by the formation of a thin film transistor. That is, the two substrates are secured by coating a sealing material to apart of the removed area where the second insulation film formed between a gate line and a source line (including drain line) is exposed. Therefore, in the technique described in JP-A-2008-46307, the lowest strength in the adhesion strength between the second insulation film and the sealing material and the strength of the thin film layer formed between the second insulation film and the substrate defines an adhesion strength of two transparent substrates at four corners of the liquid crystal display panel.

Along with increase in the fineness in recent years, the number of interconnections formed in the frame region is increased; accordingly a technique, for example, of multilayering interconnections formed in the frame region is used so as to maintain a predetermined interconnection width and suppress increase in the interconnection load. Therefore, the number of thin film layers formed between the second insulation film and the substrate in the frame region also increases, resulting in a worry that the adhesion strength of the liquid crystal display panel is lowered.

Further, if the width for the sealing material to be coated is decreased in order to further decrease the frame region, then the stress exerted per unit area of the sealing material also increases further. Thus a further improvement in the adhesion strength has been demanded.

Further, since the technique described in JP-A-2001-66607 involves increase in the width for the sealing material to be coated, it is difficult to narrow the frame region.

The present invention has been accomplished in view of the problems described above and the invention intends to provide a liquid crystal display device allowing for improvement in adhesion strength of a transparent substrate and for decrease in the portion being present outside a display area and not contributing to image display.

(1) To solve the subjects described above, the present invention provides a liquid crystal display device comprising:

a first substrate having a first planar electrode and a second linear electrode, the first electrode and the second electrode being formed by way of an insulation film;

a second substrate opposed to the first substrate;

liquid crystals put between the first substrate and the second substrate;

a rectangular display area formed with a plurality of pixels; and a sealing material formed outside the display area, the sealing material for securing the first substrate and the second substrate to each other and sealing the liquid crystals;

a driving circuit disposed to the first substrate, the driving circuit outputting a driving signal for the liquid crystals to the first electrode and the second electrode by way of interconnections formed of an electroconductive film; wherein:

the first substrate and/or the second substrate having at least one sealing hole, the sealing hole passing through thin film layers formed over the surface of the first substrate and/or the second substrate at the side where the liquid crystals are located such that the base material of the substrate is exposed, the sealing holes are formed in a region on a side opposite to the side where the driving circuit is disposed, wherein the interconnections formed of the electroconductive film are not formed over the region, and the sealing material is formed in the region including the sealing holes, and a base material of at least one of the first substrate and the second substrate is secured directly to the sealing material by way of the sealing hole.

According to the invention, since the adhesion strength of the transparent substrate can be improved, the outer portion of the display area not contributing to the image display can be further decreased.

Other advantageous effects than those described above of the invention will become apparent in view of the description of the entire specification.

DESCRIPTION OF THE PREFERRED EMBODIMENTS

Preferred embodiments of the present invention are to be described with reference to the drawings; in the following description, like parts are referenced by like numerals for which duplicate description is to be omitted.

(Embodiment 1)
(Entire Constitution)

Figure 1:
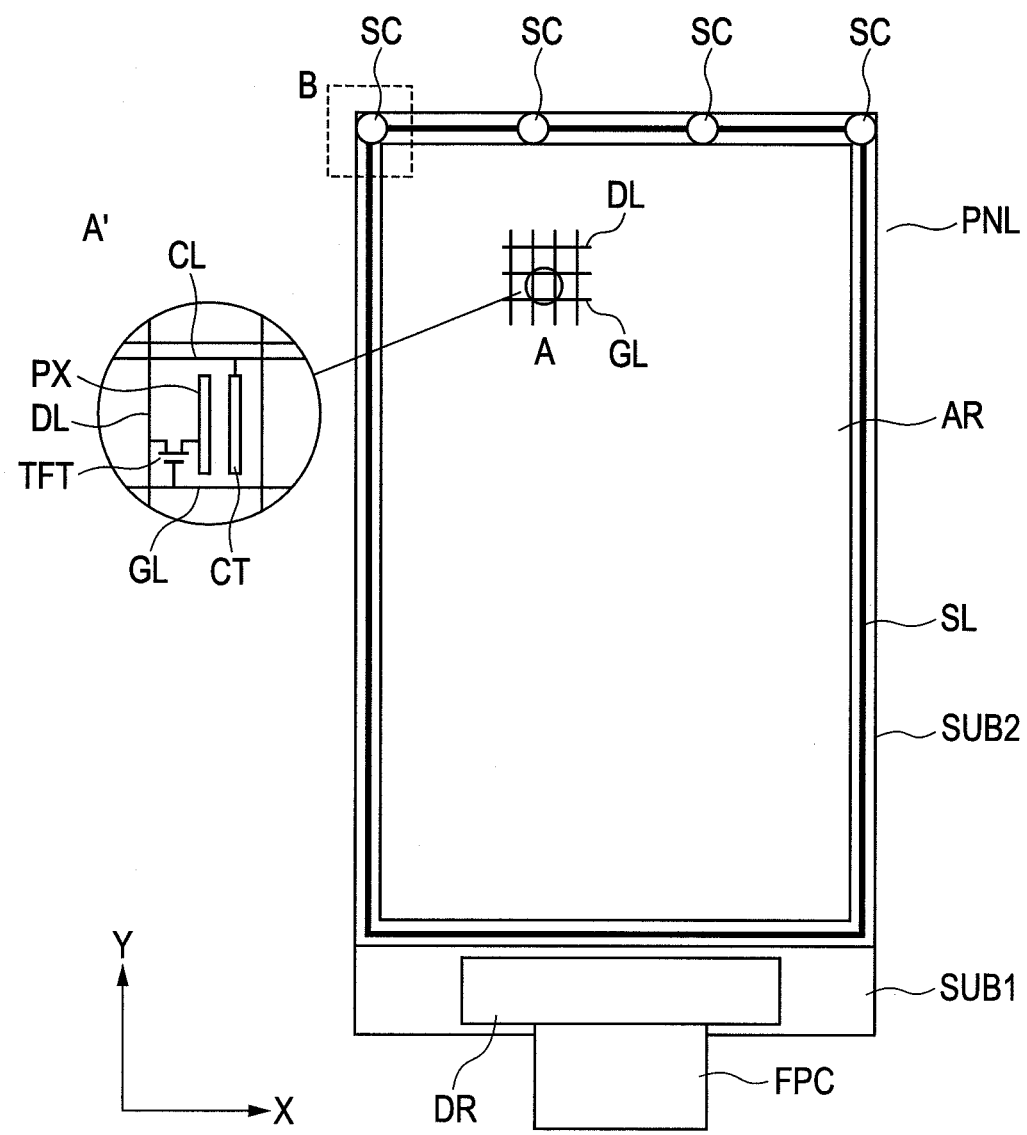
FIG. 1 is a view for assistance in explaining an entire constitution of a liquid crystal display device according to an Embodiment 1 of the present invention.

FIG. 1 is a view for assistance in explaining the entire constitution of a liquid crystal display device according to an Embodiment 1 of the present invention, particularly showing a view explaining the position at which contact holes for sealing in the Embodiment 1 are formed (hereinafter referred to as sealing contact hole). The entire constitution of the liquid crystal display device of the Embodiment 1 is to be described with reference to FIG. 1. The sealing contact holes shown in FIG. 1 are expressed in an enlarged scale for the purpose of making the position clear.

Further, X and Y shown in the drawing represent X axis and Y axis, respectively.

As shown in FIG. 1, the liquid crystal display device of the Embodiment 1 includes a liquid crystal display panel PNL. The liquid crystal display panel PNL has a first substrate SUB1 formed with pixel electrodes, etc., a second substrate SUB2 formed with color filters and black matrices and opposed to the first substrate SUB1, and a liquid crystal layer (not shown) put between the first substrate SUB1 and the second substrate SUB2. The liquid crystal display device is formed by combining the liquid crystal display panel PNL with a back light unit (not shown) serving as a light source therefor. The first substrate SUB1 is secured to the second substrate SUB2 by a sealing material SL, which is coated in a circular shape at the periphery of the second substrate SUB2. The liquid crystals are also sealed with the sealing material SL. In the following description, the liquid crystal display panel PNL is also referred to as a liquid crystal display device.

The liquid crystal display device of the Embodiment 1 is configured such that the first substrate SUB1 and the second substrate SUB2 each are formed with four sealing contact holes at the upper side of a rectangular liquid crystal display panel PNL in FIG. 1, i.e., at the upper side of the sealing material SL coated along the contour of a rectangular display area AR in FIG. 1. In this case, the sealing contact holes SC are adapted to overlap the sealing material SL but not to exceed the width of the sealing material SL (sealing width). As will be described specifically later, the sealing contact holes SC formed in the first substrate SUB1 and the second substrate SUB2 are through holes extending from the surfaces of the first substrate SUB1 and the second substrate SUB2, which surfaces face the surface of the liquid crystals (opposite surface), to the base material surface of each of the substrates SUB1 and SUB2. Accordingly, since the base material of the first substrate SUB1 and the base material of the second substrate SUB2 are secured to each other by the sealing material SL directly by way of the sealing material SL, the securing strength in a region formed with the sealing contacts SC can be improved. As a result, it is also possible, for example, to decrease the width with which the sealing material SL is formed (coating width). Further, since the sealing contacts SC are formed at the corners of the liquid crystal display panel PNL where the stress applied from the outside to the liquid crystal display panel PNL is concentrated, the securing strength between the first substrate SUB1 and the second substrate SUB2 can be improved with a less number of sealing contacts SC formed.

Further, while a well-known glass substrate is generally used, for example, as the first substrate SUB1 and the second substrate SUB2, this is not restricted to the glass substrate and the substrate may be formed of any other insulative substrates such as quartz glass or plastic (resin). Since the use of quartz glass allows the process temperature to be increased, the gate insulation film of a thin film transistor TFT, which will be described later, can be densified, and thereby its reliability can be improved. On the other hand, when a plastic (resin) substrate is used, a liquid crystal display device reduced in weight and excellent in impact resistance can be provided.

Within a region where liquid crystals are sealed, only the region where display pixels (hereinafter simply referred to as pixels) are formed is a display area AR in the liquid crystal display device of the Embodiment 1. Accordingly, even for a region where the liquid crystals are sealed, a region not formed with the pixels and not contributing to image display does not form a display area AR.

The liquid crystal display device of the Embodiment 1 includes scanning lines (gate lines) GL and video signal lines (drain lines) DL formed in the display area AR at the surface of the first substrate SUB1 on the side of the liquid crystals. The scanning lines (gate lines) GL extends in the direction X and are arranged in parallel in the direction Y in FIG. 1. The video signal lines (drain lines) DL extends in the direction Y and are arranged in parallel in the direction X in FIG. 1.

Rectangular regions surrounded by the drain lines DL and the gate lines GL each define a region where a pixel is formed and the pixels are arranged in a matrix form in the display area AR. As shown by an enlarged view A' for a portion depicted by a circle A in FIG. 1, each of the pixels has a thin film transistor TFT, a pixel electrode PX, and a common electrode CT. The thin film transistor TFT is turned on by a scanning signal from the gate line GL. The pixel electrode PX is supplied with a video signal from the drain line DL by way of the thin film transistor TFT in a state where it is turned on. The common electrode CT is connected to the common line CL and supplied with a common signal having a potential as a reference to the potential of the video signal.

An electric field having a component parallel with the main surface of the first substrate SUB1 is generated between the pixel electrode PX and the common electrode CT, and the electric field drives the molecules of the liquid crystals. Such a liquid crystal display device has been known as a device capable of performing so-called wide view angle display and is referred to as an IPS system (including IPS-Pro system) or a lateral electric field system in terms of the specificity of the application of the electric field to the liquid crystals. Further, the liquid crystal display device having the structure described above makes a display in a normally black display mode in which the light transmittance is minimized when the electric field is not applied to the liquid crystals (black display) and the application of the electric field increases the light transmittance.

In the structure of the common electrode CT shown in the enlarged view A', a common signal is inputted by way of the common line CL to the common electrodes CT formed independently on every pixel. However, the present embodiment is not restricted to such a structure and the common electrodes CT may be formed such that common electrodes CT of pixels in adjacent with each other in the direction of X are connected directly and a common signal may be inputted from one end or from opposite sides on the right and left in the direction X (end of the first substrate SUB1) by way of the common line CL.

Each of the drain lines DL and each of the gate lines GL are extended at their ends across the sealing material SL and connected with a driving circuit DR. The driving circuit DR comprises a semiconductor chip and is mounted on the first substrate SUB1, which larger than the second substrate SUB2, at the side where the liquid crystal surface is located. Although such a substrate is employed in the liquid crystal display device of the Embodiment 1, one or both of a video signal driving circuit that outputs a video signal and a scanning signal driving circuit that outputs a scanning signal may be mounted on a flexible printed substrate FPC by a tape carrier system or a COF (Chip On Film) system, and the substrate FPC fabricated may be connected to the first substrate SUB1.

(Structure of Pixel)

Figure 2:
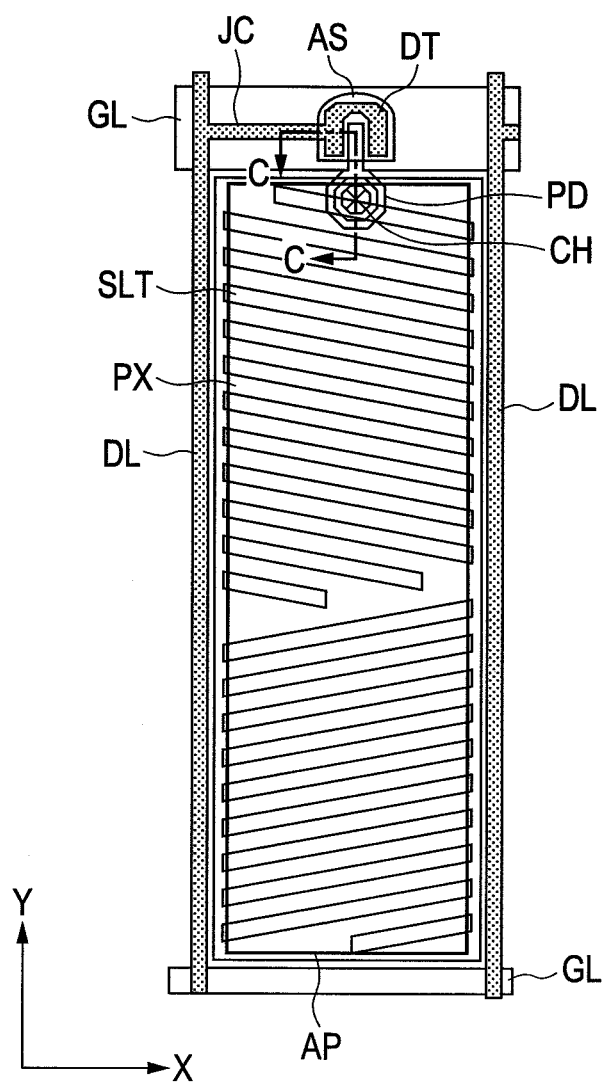
FIG. 2 is an upper plan view for assistance in explaining a pixel configuration in the liquid crystal display device according to the Embodiment 1 of the present invention.
Figure 3:
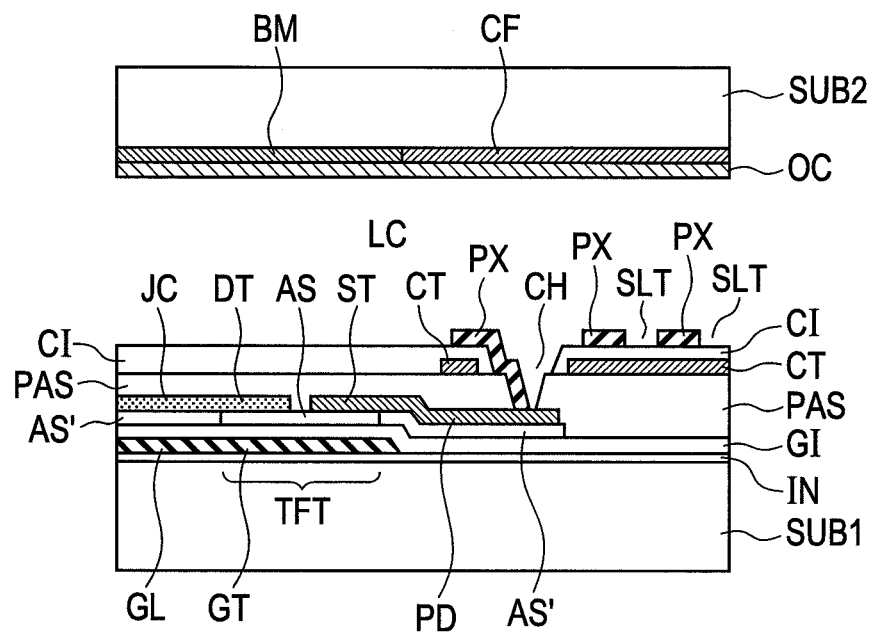
FIG. 3 is a cross sectional view along line B-B in FIG. 2.

FIG. 2 is an upper plan view for assistance in explaining the structure of a pixel in the liquid crystal display device according to the Embodiment 1 of the invention, and FIG. 3 is a cross sectional view along line C-C shown in FIG. 2. The pixel structure in the liquid crystal display device of the Embodiment 1 is to be described with reference to FIG. 2 and FIG. 3. For simplifying the explanation, only the first substrate is shown and a well-known alignment film is not illustrated in FIG. 2 and FIG. 3. Further, since the thin film including a light shielding film SB can be formed by a known photolithographic technique, detailed description for the method of forming the same is to be omitted.

As shown in FIG. 2, in the liquid crystal display device of the Embodiment 1, pixel regions correspond to regions surrounded by gate lines GL extending in the direction X and arranged in parallel in the direction Y, and drain lines DL extending in the direction Y and arranged in parallel in the direction X. With such a structure, pixels are arranged in a matrix form in the liquid crystal display device of the Embodiment 1. Further, in the liquid crystal display device of the Embodiment 1, a planar common electrode CT comprising, for example, a transparent conductive material of ITO (Indium-Tin-Oxide) is formed on the surface of the substrate SUB1 at the side where the liquid crystals are located (opposite surface). The common electrode CT is formed on the side of the first substrate SUB1 in such a manner that The common electrode CT overlaps the common line CL and, thereby, connected electrically with the common line CL. In the Embodiment 1, the gate line GL and the drain line DL are formed of a thin metal film.

Further, as shown in FIG. 3, an underlayer film 1N for protecting a thin film transistor TFT is formed on the surface of a glass substrate SUB1, and the gate line GL and the common line CL are formed in the layer over the underlayer film IN. An insulation film GI is formed in the layer thereover so as to cover the gate line GI, the common line CL, etc. The insulation film GI functions as a gate insulation film for the thin film transistor TFT in the region where the thin film transistor TFT is formed and is adapted to have a film thickness, etc. set in accordance with such a function.

A semiconductor layer AS is formed on the upper surface of the insulation film GI at a position where the semiconductor layer AS overlaps a portion of the gate line GL. The semiconductor layer AS is a semiconductor layer for the thin film transistor TFT. Further, when the semiconductor layer AS is formed, an amorphous layer AS' is formed, for example, in a layer below the drain signal line DL, in a layer below a connection portion JC, and in a layer below the extended portion of a source electrode ST (including a pad portion PD) so as to decrease the step.

Then, an extended portion (connection portion) JC extending to the side of the thin transistor TFT is provided at a portion of the drain line DL extending in the direction Y in the drawing, and the extended portion JC is connected with the drain electrode DT for the thin film transistor TFT formed on the semiconductor layer AS. Further, the drain line DL intersects the gate line GL by way of the insulation film G1 and the amorphous silicon layer AS'. Further, the source electrode ST, which is formed simultaneously upon formation of the drain line DL and the drain electrode DT, is formed to be opposed to the drain electrode DT over the semiconductor layer AS and have an extended portion slightly extended from a portion over the semiconductor layer AS to the side of the pixel region. The extended portion is formed so as to extend to the pad portion PD which is connected with the pixel electrode PX. In this case, as shown in FIG. 2, the drain electrode DT is formed, for example, as a U-shaped pattern so as to surround the top end of the source electrode ST. This allows the channel width of the thin transistor TFT to be made larger.

The thin film transistor TFT is formed as a transistor of an MIS (Metal Insulator Semiconductor) structure of a so-called inverse staggered type having the gate line GL formed as a gate electrode. Further, the transistor of the MIS structure is driven such that the drain electrode DT and the source electrode ST are alternated in response to the application of the bias. In the present specification, for the sake of convenience, an electrode on the side connected with the drain line DL is referred to as a drain electrode DT and an electrode on the side connected with the pixel electrode PX is referred to as a source electrode ST.

A protective film PAS comprising an insulation film that covers the thin film transistor TFT is formed over the surface of the first substrate SUB1. The protective film PAS is disposed to avoid the direct contact between the thin transistor TFT and the liquid crystal and planarize the surface of the first substrate SUB1 along with formation of the thin transistor TFT. Accordingly, as will be described later, the protective film PAS is formed to extend over the entire surface of the first substrate SUB1 at the side where the liquid crystals are located, that is, to a region including the side edge portion. A common electrode CT is formed in the layer over the protective film PAS, a capacitance insulation film CI that functions as a dielectric film of a capacitance element is formed in the layer thereover, and a pixel electrode PX is formed in the layer thereover by way of the capacitance insulation film CI. In this case, a contact hole CH extending to the pad portion PD is formed in the capacitance insulation film CI and the protective film PAS, and the pixel electrode PX and the source electrode ST of the thin film transistor TFT are electrically connected to each other by way of the contact hole CH.

The pixel electrode PX of the Embodiment 1 is configured such that, after a transparent electrode film comprising, for example, ITO is formed in a planar shape in the region of the pixel, a plurality of slits SLT crossing the direction Y are formed in a portion corresponding to a region AP through which light from a back light passes, thereby providing a linear (comb shape) electrode overlapping the common electrode CT in the passing region AP. Further, in the Embodiment 1, two regions, i.e., a region near the thin film transistor TFT and the other region remote therefrom are formed in one pixel region. The two regions are formed such that the angle of the slits SLT (angle of inclination with respect to the direction Y) is different between the two regions, thereby making different the angle of inclination of the linear electrode portion in the passing region AP. With such a structure, transmittance is improved and the view angle dependence is lessened in a region where the slits SLT are formed. While the pixel electrode PX is formed such that the ends of the slits SLT are not opened in the Embodiment 1, the Embodiment 1 is not restricted to such a structure but one or both ends of the slits may also be opened.

Further, color filters CF of R (red), G (green), and B (blue) for forming pixels for color display are formed on the second substrate SUB2, which is opposed to the first substrate SUB1 by way of the liquid crystal LC, at the side where the liquid crystals are located. A black matrix BM as a light shielding film is formed at the boundary between the black matrix and each of the color filters CF. An overcoat layer OC as a protective film is formed in the layer over the color filter CF and the black matrix BM, and an alignment film (not shown) is formed in the layer thereover.

(Structure of Sealing Portion)

Figure 4:
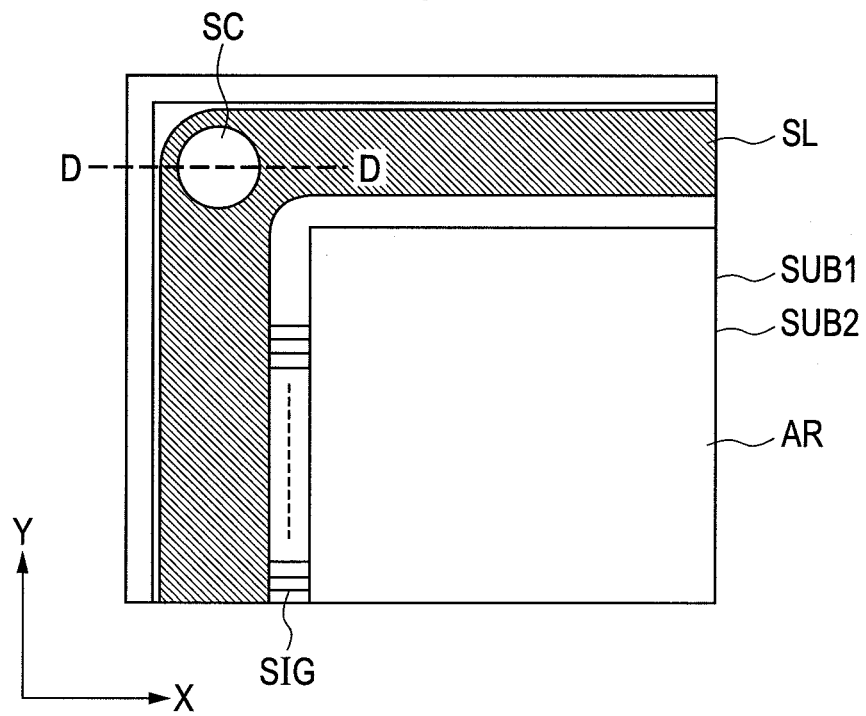
FIG. 4 is an enlarged view for a portion B shown in FIG. 1.
Figure 5:
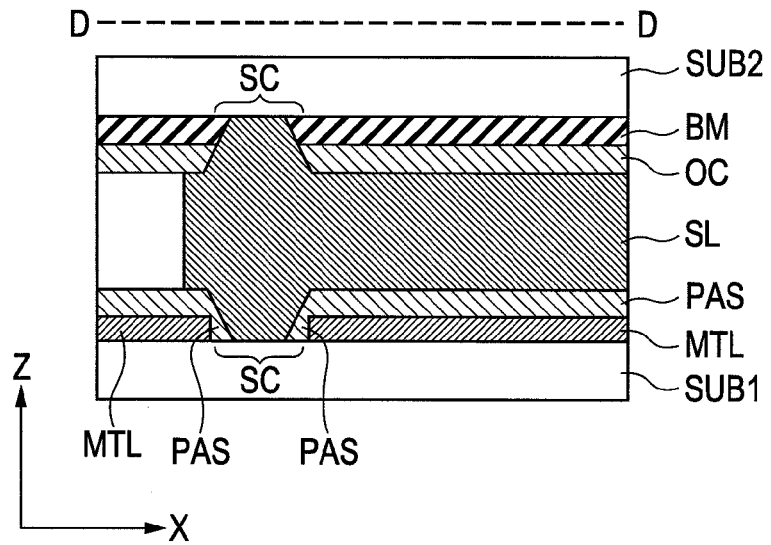
FIG. 5 is a cross sectional view along line D-D shown in FIG. 4.

Then, FIG. 4 shows an enlarged view of a portion B shown in FIG. 1 and FIG. 5 shows a cross sectional view along line D-D shown in FIG. 4. Description is made of the details of the sealing contact hole SC in the liquid crystal display device of the Embodiment 1 with reference to FIGS. 1 to 5.

As shown in FIGS. 4 and 5, the liquid crystal display panel of the Embodiment 1 is configured such that the sealing material SL for securing the first substrate SUB1 to the second substrate SUB2 is coated while overlapping leading interconnections SIG extended from the gate lines GL formed to the outer periphery of the display area AR. In the Embodiment 1, leading interconnections (not shown) extended from the drain lines are led out to the lower portion of the liquid crystal display panel PNL, that is, on the side where the driving circuit DR is mounted. Accordingly, in the liquid crystal display panel PNL of the Embodiment 1, the leading interconnections SIG are formed in the left region and the lower region of the display area AR in FIG. 4. Accordingly, the sealing material SL overlaps the leading interconnections in the left region and the lower region of the display area AR in FIG. 1.

Accordingly, the sealing contact holes SC of the Embodiment 1 are formed in the region above the display area AR shown in FIG. 1 which is a region not overlapping the leading interconnections SIG at the corner of the liquid crystal display panel PNL within the region where the sealing material SL is coated. As described above, since a number of leading interconnections SIG for connecting the gate lines GL to the driving circuit DR are formed on the side where the driving circuit DR is disposed (for example, lower left portion in FIG. 1), the sealing contacts SC in the Embodiment 1 are formed at a position on a side opposite to the side where the driving circuit DR is disposed, with such a position corresponding to a position where the sealing material SL is formed.

That is, the sealing contact hole SC of the Embodiment 1 has a circular shape and has such a diametrical size as not to exceed the sealing width of the sealing material SL. Further, the sealing contact hole SC of the invention is formed while overlapping the sealing material SL, and is formed not to protrude to the outside of the sealing material SL across the range in which the sealing material SL is formed as viewed from the side of the display surface.

Then, the detailed structure of the sealing contact hole SC of the Embodiment 1 is to be described with reference to FIG. 5. In the following description, a layer including a thin metal film layer, etc. formed on the first substrate SUB1 at the side where the liquid crystals are located and extending in a coating region of the sealing material SL is referred to as a metal layer MTL. Further, a protective film PAS formed in the layer over the thin film transistor comprises an inorganic insulation film, an organic insulation film, etc. as described above. In the Embodiment 1, the sealing contact holes SC are formed in a region other than positions at which to form the metal layer MTL, that is, a thin metal film forming leading interconnections SIG, interconnections formed of a transparent electroconductive film, and a thin film transistor, which are all formed over the surface of the first substrate SUB1 at the side where the liquid crystals are located. Thus only the protective film PAS is formed over the surface of the first substrate SUB1 in the region described above. Accordingly, as shown in FIG. 5, the sealing contact hole SC passes through the protective film PAS and reaches the surface of the first substrate SUB1 by etching the protective film PAS. Thus, the surface of the glass substrate as the base material of the first substrate SUB1 is exposed, and upon sealing the sealing material SL is tightly secured to the glass substrate with the sealing material SL in direct contact with the glass substrate as the base material of the first substrate SUB1.

Likewise, the sealing contact holes SC are to be provided for the second substrate SUB2. A color filter CF, a black matrix BM, and an overcoat layer OC are formed over the surface of the second substrate SUB2 at the side where the liquid crystals are located; however the color filter CF is formed only within the display area AR. Accordingly, in the region of the second substrate SUB2 where the sealing material SL is formed, the black matrix BM is formed on the surface of the glass substrate which is a base material of the second substrate SUB2 and the overcoat layer OC is formed in the layer thereover. Accordingly, as shown in FIG. 5, by the etching of the black matrix BM and the overcoat layer OC, the sealing contact hole SC passes through the black matrix BM and the overcoat layer OC formed over the surface of the second substrate SUB2 at the side where the liquid crystals are located and reaches the surface of the second substrate SUB2. Thus the glass substrate as the base material of the second substrate SUB2 is exposed, and upon sealing the sealing material SL is tightly secured to the glass substrate with the sealing material SL in direct contact with the glass substrate as the base material of the second substrate SUB2.

Further, when a planar electroconductive film, etc. is to be formed in the region at which the sealing material SL is formed, a first contact hole to serve as a sealing contact hole SC after the metal layer MTL has been formed is formed. Then after a protective film PAS is formed in the layer over the metal layer MTL, the protective film PAS is made to overlap the first contact hole, thereby forming a second contact hole whose size is smaller than the first contact hole to form a sealing contact hole SC. Thus a sealing contact hole SC where the metal layer MTL and the sealing material SL are not in direct contact with each other can be formed in the same manner as the sealing contact hole SC is formed in a region other than the region for the metal layer MTL.

As has been described above, the sealing contact hole SC of the Embodiment 1 is formed and its relevant portions are secured by the sealing material SL. In such a region where the sealing contact hole SC as shown in FIG. 5 has been formed, the base material of the first substrate SUB1 (for example, glass) and the sealing material SL, and the base material of the second substrate SUB2 (for example, glass) and the sealing material SL are in direct contact with each other without the thin film or the like, whereby the first substrate SUB1 and the second substrate SUB2 can be secured to each other. That is, since the glass substrates having the highest bonding property (adhesion strength) are secured to each other by the sealing material SL, the securing strength between the first substrate SUB1 and the second substrate SUB2 that form the liquid crystal display panel PNL can be improved. Further, the frame region is narrowed and the width for the sealing material SL to be coated is reduced further. Even if the region for the sealing material SL to be coated overlaps the region at which the alignment film is to be formed, the first substrate SUB1 and the second substrate SUB2 can be secured without deteriorating the bonding property.

Figure 6:
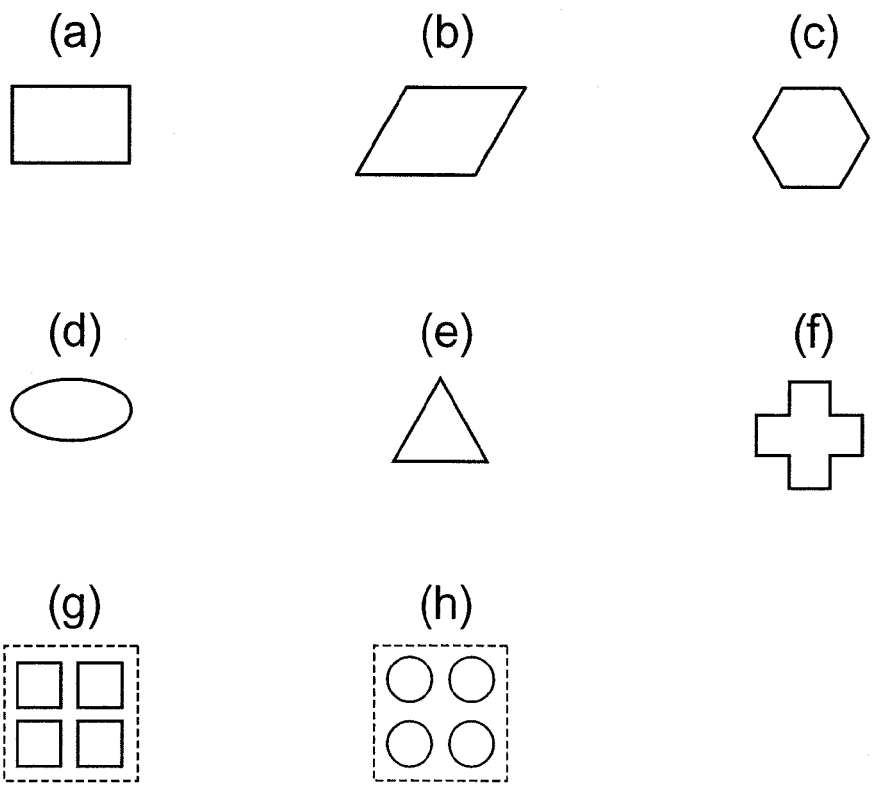
FIGS. 6(a) to 6(h) are views for assistance in explaining other shapes of sealing contact holes in the liquid crystal display device according to the Embodiment 1 of the present invention.

While the shape of the sealing contact hole SC as described above, has a circular shape, the shape of the sealing contact hole SC may also be in other shapes as shown in FIGS. 6(a) to 6(h). For example, it may be any of shapes such as a rectangular shape including a square as shown in FIG. 6(a), parallelogram as shown in FIG. 6(b), a polygonal shape including a hexagonal shape as shown in FIG. 6(c), an elliptical shape as shown in FIG. 6(d), a trigonal shape as shown in FIG. 6(e), or a specific shape as shown in FIG. 6(f). In particular, a sealing contact hole SC can be formed by using other shapes optionally even in a region where the metal layer MTL is formed with the electroconductive film.

Further, in the present invention, a plurality of small sealing contact holes SC, for example, such as a group of rectangular shapes shown in FIG. 6(g) or a group of circular shapes shown in FIG. 6(h) may be formed as a substitute for one sealing contact hole SC of an identical area. However, since the bonding property can be generally improved more when the contact hole is formed as one contact hole than the same as plural holes providing that the area of the sealing material is identical, it is preferred to form the sealing contact hole SC with one contact hole so long as it is permitted.

Figure 7:
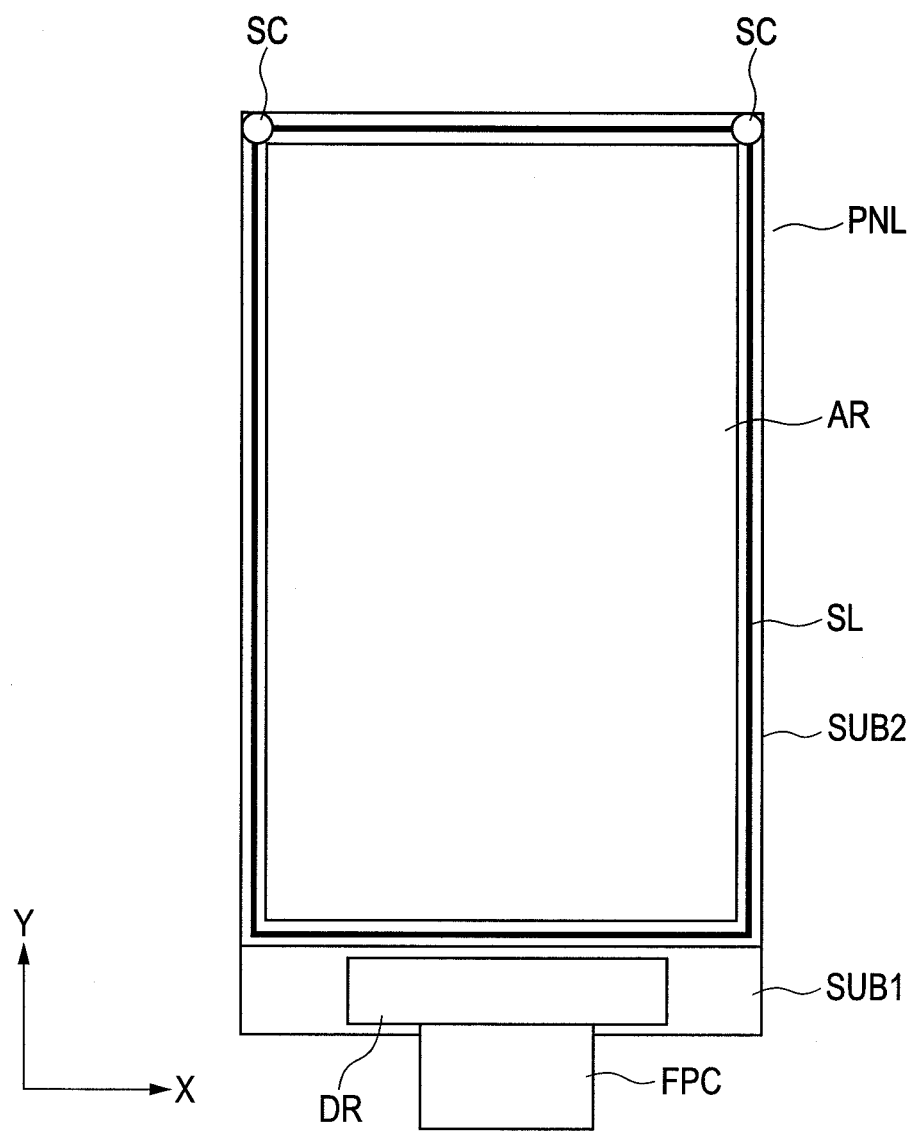
FIG. 7 is a view for assistance in explaining other positions of forming sealing contact holes in the liquid crystal display device according to the Embodiment 1 of the present invention.

Further, while description has been made of a case in which four sealing contact holes SC are formed per side in the liquid crystal display device of the Embodiment 1, the present embodiment is not restricted by such a scheme. For example, as shown in FIG. 7, the sealing contact holes may be formed at the end of one upper side in the drawing, that is, at the corners on the upper end of the liquid crystal display panel PNL. Furthermore, it may be formed at any position, for example, as in a case where the sealing contact holes SC on opposite ends in FIG. 1 is excluded. However, since the stress, when it is applied to the liquid crystal display panel PNL, concentrates to the corners of the liquid crystal display panel PNL, it is possible to improve the bonding property by a lesser number of sealing contacts when the sealing contact holes SC are formed at the corners.

(Embodiment 2)

Figure 8:
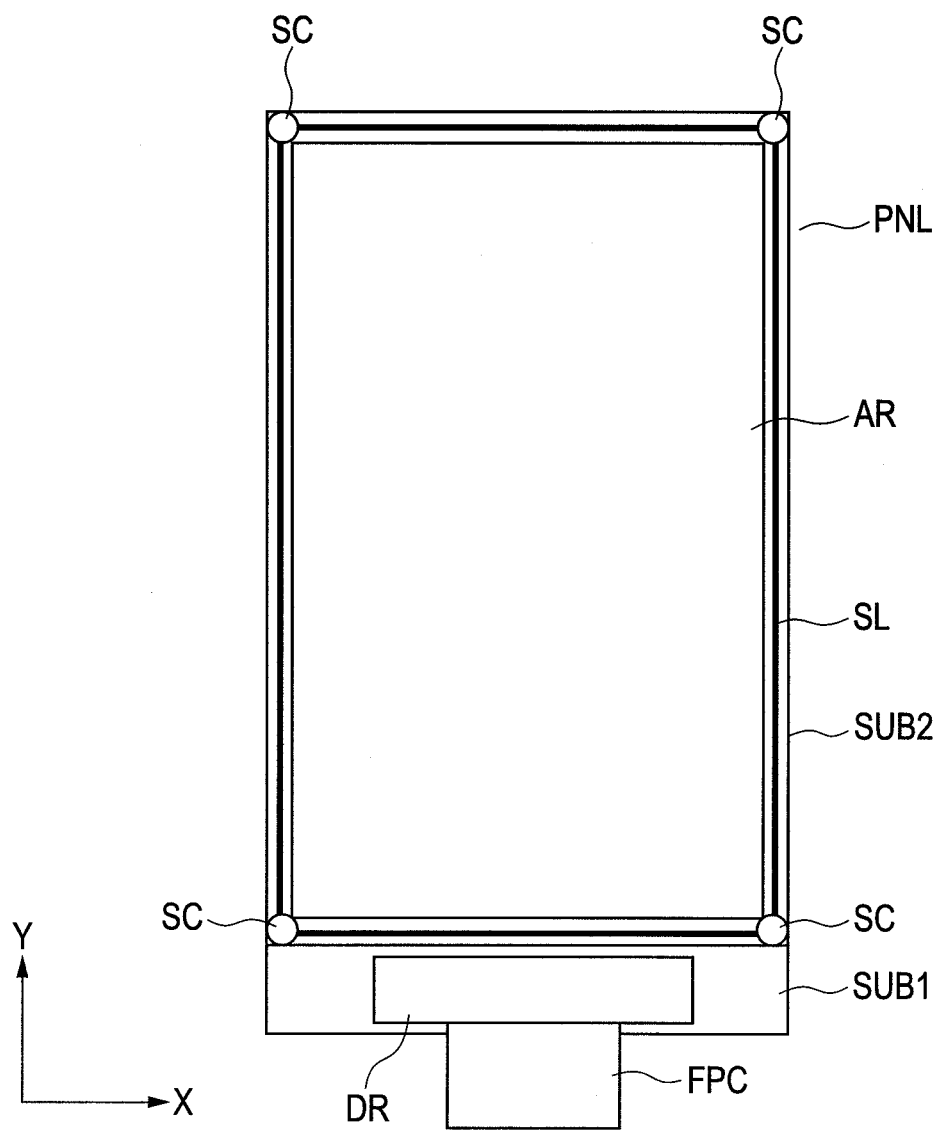
FIG. 8 is a view for assistance in explaining a schematic constitution of a liquid crystal display device according to an Embodiment 2 of the present invention.

FIG. 8 is a view for assistance in explaining a schematic constitution of a liquid crystal display device of an Embodiment 2 according to the invention. The liquid crystal display device of the Embodiment 2 has a constitution identical with that of the liquid crystal display device of the Embodiment 1 except for the position at which the sealing contact holes SC is formed and positions at which lead interconnections associated with the formation of the sealing contact holes are formed. Accordingly, in the following description, the positions at which to form the sealing contact holes SC and the leading interconnections are to be described specifically.

As shown in FIG. 8, the liquid crystal display device of the Embodiment 2 is configured such that sealing contact holes SC are formed at all of four corners of a liquid crystal display panel PNL. That is, in the liquid crystal display device of the Embodiment 2, the sealing contact holes SC are formed also on the side where a driving circuit DR is formed. On the other hand, as described above, not illustrated leading interconnections for connecting not illustrated drain lines and the driving circuit DR and not illustrated leading interconnections for connecting not illustrated gate lines and the driving circuit DR are formed in the lower left region in FIG. 8. To enable such a configuration, for example, the leading interconnections are multilayered in the region. Further, the position at which the leading interconnections are formed in the region above the display area AR in the drawing are at the position on the right of the liquid crystal display panel PNL in the drawing and the position at which the leading interconnections are formed in the lower region are at the position on the left of the liquid crystal display panel PNL, so that the sealing contact holes SC can be formed on the side where the driving circuit DR is disposed.

With the constitution described above, when the sealing contact holes SC are formed at four corners of the liquid crystal display panel PNL, it is possible to further improve the bonding property between the first substrate SUB1 and the second substrate SUB2 of which the liquid crystal display device is composed.

In the liquid crystal display device of the Embodiments 1 and 2, sealing contact holes SC may be formed to overlap the sealing material SL on the side in the direction Y having in common corners at the side opposite to the side where the driving circuit DR is disposed.

While the inventions made by the present inventors have been described specifically with reference to the preferred embodiments of the invention but the invention is not restricted to the preferred embodiments but may be modified variously within a range not departing from the gist of the invention.

What is claimed is:

1. A liquid crystal display device comprising:
a first substrate having a first planar electrode and a second linear electrode, the first electrode and the second electrode being formed by way of an insulation film;
a second substrate opposed to the first substrate;
liquid crystals put between the first substrate and the second substrate;
a rectangular display area formed with a plurality of pixels; and
a sealing material formed outside the display area, the sealing material for securing the first substrate and the second substrate to each other and sealing the liquid crystals;
a driving circuit disposed to the first substrate, the driving circuit outputting a driving signal for the liquid crystals to the first electrode and the second electrode by way of interconnections formed of an electroconductive film;
wherein:
the first substrate and/or the second substrate having at least one sealing hole, the sealing hole passing through thin film layers formed over the surface of the first substrate and/or the second substrate at the side where the liquid crystals are located such that the base material of the substrate is exposed,
the sealing holes are formed in a region on a side opposite to the side where the driving circuit is disposed, wherein the interconnections formed of the electroconductive film are not formed over the region,
the sealing material is formed in the region including the sealing holes, and a base material of at least one of the first substrate and the second substrate is secured directly to the sealing material by way of the sealing hole, and
the first substrate and the second substrate have at least two sealing holes at positions where the first substrate overlaps the second substrate.

2. The liquid crystal display device according to claim 1, wherein, of corners of a rectangular sealing material formed outside the display area, the sealing hole is formed at at least one of corners common to a side opposed by way of the display area.

3. The liquid crystal display device according to claim 2, wherein the sealing holes are formed at four corners of the rectangular sealing material formed outside the display area.

4. The liquid crystal display device according to claim 1, wherein the sealing hole comprises a group of a plurality of through holes.

5. The liquid crystal display device according to claim 1, wherein the sealing material is light permeable, light screening means overlapping the position at which to form the sealing hole is provided on a side of the first substrate whose surface faces the display surface and a side of the second substrate whose surface faces the light source.

6. The liquid crystal display device according to claim 1, wherein the at least two sealing holes include a first sealing hole in the first substrate and a second sealing hole in the second substrate at positions where the first substrate overlaps the second substrate, thereby forming a pair of the sealing holes in the first substrate and the second substrate.

7. The liquid crystal display device according to claim 1, wherein each of the first substrate and the second substrate have a plurality of sealing holes at the positions where the first substrate overlaps the second substrate.

8. The liquid crystal display device according to claim 1, wherein the sealing holes in the first and second substrates are completely filled with the sealing material.

* * * * *